United States Patent
Yoon et al.

(10) Patent No.: US 11,785,194 B2
(45) Date of Patent: Oct. 10, 2023

(54) CONTEXTUALLY-AWARE CONTROL OF A USER INTERFACE DISPLAYING A VIDEO AND RELATED USER TEXT

(71) Applicant: Microsoft Technology Licensing, LLC, Redmond, WA (US)

(72) Inventors: Dongwook Yoon, Vancouver (CA); Sol Sidney Fels, Vancouver (CA); Matin Yarmand, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/389,828

(22) Filed: Apr. 19, 2019

(65) Prior Publication Data

US 2020/0336718 A1   Oct. 22, 2020

(51) Int. Cl.
*H04N 9/87* (2006.01)
*G06F 3/04842* (2022.01)

(52) U.S. Cl.
CPC .......... *H04N 9/87* (2013.01); *G06F 3/04842* (2013.01)

(58) Field of Classification Search
CPC ... H04N 9/87; G06F 3/04842; G06F 3/04841; G06F 3/04843
See application file for complete search history.

(56) References Cited

U.S. PATENT DOCUMENTS

| | | |
|---|---|---|
| 6,564,383 B1 | 5/2003 | Combs et al. |
| 6,921,336 B1 | 7/2005 | Best |
| 7,712,125 B2 | 5/2010 | Herigstad et al. |
| 7,941,762 B1 | 5/2011 | Tovino et al. |

(Continued)

FOREIGN PATENT DOCUMENTS

| | | |
|---|---|---|
| CN | 101288069 A | 10/2008 |
| CN | 103621106 A | 3/2014 |

(Continued)

OTHER PUBLICATIONS

Bakhshi, et al., "Faces engage us: Photos with faces attract more likes and comments on Instagram.", In Proceedings of the SIGCHI Conference on Human Factors in Computing Systems, Apr. 26, 2014, pp. 965-974.

Bangor, et al., "Determining what individual SUS scores mean: Adding an adjective rating scale", In Journal of Usability Studies, vol. 4, Issue 3, May 1, 2009, 8 Pages.

Brooke, John, "SUS—A quick and dirty usability scale", In Proceedings of Usability evaluation in industry, vol. 189, Issue 194, Sep. 1996, 7 Pages.

(Continued)

*Primary Examiner* — Michael Roswell
(74) *Attorney, Agent, or Firm* — Scott Y. Shigeta; Newport IP, LLC

(57) ABSTRACT

The disclosed techniques provide a computing device that displays video content within a comment section of a user interface. When users invoke a video display by selecting a link within a user interface comment section, a system can control a navigational position of a user interface to concurrently display the video and selected comments within the comment section. In one illustrative example, a system can display a user interface having a video display area and a comment section. The user interface may be positioned to show the comment section within a viewing area of a display device, and such a position may place the video display area outside of the viewing area. In such a scenario, when a system receives a user input indicating a selection of a comment displayed within the comment section, the system can generate a rendering of the video content for display within the comment section.

16 Claims, 13 Drawing Sheets

(56) References Cited

U.S. PATENT DOCUMENTS

| | | | |
|---|---|---|---|
| 8,332,886 B2* | 12/2012 | Lanza | H04N 7/17318 |
| | | | 725/32 |
| 8,531,050 B2 | 9/2013 | Barney et al. | |
| 8,698,746 B1 | 4/2014 | Merrick | |
| 8,740,708 B2 | 6/2014 | Karacal et al. | |
| 8,819,719 B1* | 8/2014 | Chen | H04N 21/4758 |
| | | | 725/24 |
| 8,830,170 B2 | 9/2014 | Kao et al. | |
| 8,984,405 B1 | 3/2015 | Geller et al. | |
| 8,996,625 B1* | 3/2015 | Singleton | H04L 29/06 |
| | | | 709/206 |
| 9,918,128 B2 | 3/2018 | Courouge et al. | |
| 9,966,112 B1* | 5/2018 | Kulkarni | H04N 21/26258 |
| 10,009,644 B2 | 6/2018 | Aimone et al. | |
| 10,163,073 B2* | 12/2018 | Staats | H04L 51/22 |
| 10,171,877 B1 | 1/2019 | Shah et al. | |
| 10,303,328 B2* | 5/2019 | Na | G06F 9/453 |
| 10,924,441 B1* | 2/2021 | Lewis | G06F 16/9566 |
| 11,025,684 B2* | 6/2021 | Lin | H04L 51/18 |
| 2002/0069218 A1 | 6/2002 | Sull | |
| 2002/0078456 A1 | 6/2002 | Hudson et al. | |
| 2002/0120925 A1 | 8/2002 | Logan | |
| 2002/0144273 A1 | 10/2002 | Reto | |
| 2002/0162120 A1 | 10/2002 | Mitchell | |
| 2003/0216177 A1 | 11/2003 | Aonuma et al. | |
| 2004/0098754 A1 | 5/2004 | Vella et al. | |
| 2004/0260753 A1 | 12/2004 | Regan | |
| 2005/0210502 A1 | 9/2005 | Flickinger et al. | |
| 2006/0041472 A1 | 2/2006 | Lukose et al. | |
| 2006/0064716 A1 | 3/2006 | Sull et al. | |
| 2006/0173821 A1 | 8/2006 | Hennum et al. | |
| 2007/0022437 A1 | 1/2007 | Gerken et al. | |
| 2007/0033515 A1 | 2/2007 | Sull et al. | |
| 2007/0052177 A1 | 3/2007 | Ikeda et al. | |
| 2007/0060391 A1 | 3/2007 | Ikeda et al. | |
| 2007/0124756 A1 | 5/2007 | Covell et al. | |
| 2007/0124775 A1 | 5/2007 | Dacosta | |
| 2007/0244902 A1 | 10/2007 | Seide et al. | |
| 2007/0245243 A1 | 10/2007 | Lanza et al. | |
| 2007/0271580 A1 | 11/2007 | Tischer et al. | |
| 2008/0046925 A1 | 2/2008 | Lee et al. | |
| 2008/0082510 A1 | 4/2008 | Wang et al. | |
| 2008/0178241 A1 | 7/2008 | Gilboy | |
| 2009/0007200 A1 | 1/2009 | Amento et al. | |
| 2009/0049385 A1 | 2/2009 | Blinnikka et al. | |
| 2009/0067847 A1 | 3/2009 | Nakamura | |
| 2009/0163274 A1 | 6/2009 | Kando | |
| 2009/0164904 A1* | 6/2009 | Horowitz | G06F 16/78 |
| | | | 715/723 |
| 2009/0187825 A1 | 7/2009 | Sandquist et al. | |
| 2009/0195392 A1 | 8/2009 | Zalewski et al. | |
| 2009/0210778 A1* | 8/2009 | Kulas | G06Q 10/107 |
| | | | 715/201 |
| 2009/0210779 A1 | 8/2009 | Badoiu et al. | |
| 2009/0249388 A1 | 10/2009 | Seidel et al. | |
| 2010/0122309 A1* | 5/2010 | Kawakami | H04N 21/4722 |
| | | | 725/116 |
| 2010/0192173 A1 | 7/2010 | Mizuki et al. | |
| 2010/0199182 A1 | 8/2010 | Lanza et al. | |
| 2010/0199318 A1 | 8/2010 | Chang et al. | |
| 2011/0010656 A1* | 1/2011 | Mokotov | G06Q 10/10 |
| | | | 715/780 |
| 2011/0055713 A1* | 3/2011 | Gruenewald | G06Q 10/00 |
| | | | 715/738 |
| 2011/0190052 A1 | 8/2011 | Takeda et al. | |
| 2011/0247042 A1 | 10/2011 | Mallinson | |
| 2012/0039539 A1 | 2/2012 | Boiman et al. | |
| 2012/0046767 A1 | 2/2012 | Shimohata et al. | |
| 2012/0133582 A1 | 5/2012 | Ohsawa et al. | |
| 2012/0151320 A1* | 6/2012 | McClements, IV | G06Q 50/01 |
| | | | 715/230 |
| 2012/0151347 A1 | 6/2012 | Mcclements et al. | |
| 2012/0192222 A1 | 7/2012 | Kumar et al. | |
| 2012/0192228 A1 | 7/2012 | Zito et al. | |
| 2012/0210252 A1* | 8/2012 | Fedoseyeva | G06Q 10/06398 |
| | | | 715/753 |
| 2012/0297400 A1 | 11/2012 | Hill et al. | |
| 2012/0309515 A1 | 12/2012 | Chung et al. | |
| 2013/0004138 A1* | 1/2013 | Kilar | H04N 21/4788 |
| | | | 386/230 |
| 2013/0011121 A1 | 1/2013 | Forsyth et al. | |
| 2013/0024532 A1* | 1/2013 | Lee | H04N 21/4126 |
| | | | 709/206 |
| 2013/0154923 A1 | 6/2013 | Mock | |
| 2013/0163948 A1 | 6/2013 | Kano | |
| 2013/0171897 A1 | 7/2013 | Hsu | |
| 2013/0238413 A1 | 9/2013 | Carlson et al. | |
| 2013/0332523 A1* | 12/2013 | Luu | G06Q 30/0269 |
| | | | 709/204 |
| 2013/0335226 A1 | 12/2013 | Shen et al. | |
| 2014/0033040 A1 | 1/2014 | Thomas et al. | |
| 2014/0040776 A1* | 2/2014 | Dann | G06F 3/0485 |
| | | | 715/753 |
| 2014/0052513 A1 | 2/2014 | Ryan et al. | |
| 2014/0067828 A1 | 3/2014 | Archibong et al. | |
| 2014/0079371 A1 | 3/2014 | Tang et al. | |
| 2014/0089801 A1* | 3/2014 | Agrawal | H04N 21/8547 |
| | | | 715/719 |
| 2014/0168071 A1 | 6/2014 | Ahmed et al. | |
| 2014/0215360 A1 | 7/2014 | Degani et al. | |
| 2014/0219629 A1 | 8/2014 | Mcintosh et al. | |
| 2014/0219634 A1 | 8/2014 | Mcintosh et al. | |
| 2014/0309511 A1 | 10/2014 | Stål | |
| 2014/0340465 A1 | 11/2014 | Shi et al. | |
| 2015/0046812 A1 | 2/2015 | Darby et al. | |
| 2015/0100915 A1* | 4/2015 | Kubota | G06F 3/0485 |
| | | | 715/784 |
| 2015/0121418 A1 | 4/2015 | Jain et al. | |
| 2015/0143211 A1 | 5/2015 | Fairweather | |
| 2015/0182861 A1* | 7/2015 | Winter | G06F 16/743 |
| | | | 705/14.14 |
| 2015/0293996 A1 | 10/2015 | Liu | |
| 2015/0365716 A1 | 12/2015 | Fonseca et al. | |
| 2016/0182423 A1* | 6/2016 | Tevosyan | G06F 3/0482 |
| | | | 715/752 |
| 2016/0247535 A1 | 8/2016 | Latulipe et al. | |
| 2016/0259790 A1* | 9/2016 | Mashiach | G06F 16/24578 |
| 2016/0284382 A1 | 9/2016 | Luo | |
| 2016/0359771 A1 | 12/2016 | Sridhar | |
| 2016/0373388 A1* | 12/2016 | Katis | H04W 4/50 |
| 2017/0017639 A1 | 1/2017 | Bute et al. | |
| 2017/0060823 A1* | 3/2017 | Zheng | H04L 51/32 |
| 2017/0070779 A1 | 3/2017 | Kim et al. | |
| 2017/0131864 A1* | 5/2017 | Edgar | G06F 3/0485 |
| 2017/0140051 A1* | 5/2017 | Ball | H04L 51/32 |
| 2017/0154125 A1 | 6/2017 | Balakrishnan et al. | |
| 2017/0169856 A1 | 6/2017 | Wang | |
| 2017/0180276 A1 | 6/2017 | Gershony et al. | |
| 2017/0187772 A1 | 6/2017 | Paul | |
| 2017/0249017 A1 | 8/2017 | Ryu et al. | |
| 2017/0295402 A1 | 10/2017 | Courouge et al. | |
| 2017/0374414 A1 | 12/2017 | Knox | |
| 2018/0109828 A1 | 4/2018 | Knox | |
| 2018/0115802 A1 | 4/2018 | Knox | |
| 2018/0124438 A1 | 5/2018 | Barnett | |
| 2018/0124458 A1 | 5/2018 | Knox | |
| 2018/0124459 A1 | 5/2018 | Knox | |
| 2018/0211552 A1 | 7/2018 | Samuelson et al. | |
| 2018/0293313 A1 | 10/2018 | Hauptmann et al. | |
| 2018/0309705 A1* | 10/2018 | Stahl | H04L 51/10 |
| 2018/0322346 A1* | 11/2018 | Davies | G06F 16/95 |
| 2018/0356952 A1* | 12/2018 | Boothroyd | G06Q 10/10 |
| 2019/0034483 A1 | 1/2019 | Millius et al. | |
| 2019/0197101 A1 | 6/2019 | Lambert et al. | |
| 2019/0246165 A1 | 8/2019 | Brouwer et al. | |
| 2020/0012718 A1 | 1/2020 | Kung et al. | |
| 2020/0044996 A1* | 2/2020 | Johnson | H04L 51/046 |
| 2020/0067867 A1* | 2/2020 | Tal | H04L 51/18 |
| 2020/0120392 A1* | 4/2020 | Tang | H04N 21/4788 |
| 2020/0336794 A1 | 10/2020 | Fels et al. | |

(56) References Cited

U.S. PATENT DOCUMENTS

| | | |
|---|---|---|
| 2020/0336805 A1 | 10/2020 | Yoon et al. |
| 2020/0336806 A1 | 10/2020 | Fels et al. |

FOREIGN PATENT DOCUMENTS

| | | |
|---|---|---|
| CN | 105580013 A | 5/2016 |
| JP | 2010079577 A | 4/2010 |
| KR | 20150030387 A | 3/2015 |
| WO | 0028396 A2 | 5/2000 |

OTHER PUBLICATIONS

Brush, et al., "Supporting Interaction Outside of Class: Anchored Discussions vs. Discussion Boards", In Proceedings of the Conference on Computer Support for Collaborative Learning: Foundations for a CSCL Community, Jan. 7, 2002, 10 Pages.

Chorianopoulos, Konstantinos, "A taxonomy of asynchronous instructional video styles", In the Proceedings of International Review of Research in Open and Distributed Learning, vol. 19, Issue 1, Feb. 1, 2018, pp. 294-311.

Christensen, et al., "The MOOC phenomenon: Who takes massive open online courses and why", In SSRN eLibrary, Dec. 2014, 9 Pages.

Chua, et al., "Facilitating complex referencing of visual materials in asynchronous discussion interface", In Proceedings of the ACM on Human-Computer Interaction, vol. 1, Issue 2, Article 34, Nov. 2017,19 Pages.

Clark, et al., "Grounding in communication", In American Psychological Association from Perspectives on Socially Shared Cognition, Jan. 1, 1991, pp. 127-149.

Clark, Herbert H., "Using language", By Cambridge University Press, 1996, 58 Pages.

Dorn, et al., "Piloting TrACE: Exploring Spatiotemporal Anchored Collaboration In Asynchronous Learning", In Proceedings of the 18th ACM Conference on Computer Supported Cooperative Work & Social Computing Mar. 14, 2015, pp. 393-403.

Fong, et al., "ViDeX: A platform for personalizing educational videos", In Proceedings of the 18th ACM/IEEE Joint Conference on Digital Libraries, Jun. 033, 2018, pp. 331-332.

Fussell, et al., "Gestures Over Video Streams To Support Remote Collaboration On Physical Tasks", In Journal of Human-Computer Interaction, vol. 19, Issue 3, Sep. 1, 2004, pp. 273-309.

Gergle, et al., "Language Efficiency and Visual Technology: Minimizing Collaborative Effort with Visual Information.", In Journal of Language and Social Psychology, vol. 23, Issue 4, Dec. 1, 2004, pp. 491-517.

Glassman, et al., "Mudslide: A Spatially Anchored Census of Student Confusion for Online Lecture Videos", In Proceedings of the 33rd Annual ACM Conference on Human Factors in Computing Systems, Apr. 18, 2015, pp. 1555-1564.

Hupet, et al., "The effects of the codability and discriminability of the referents on the collaborative referring procedure", In British Journal of Psychology, vol. 82, Issue 4, Nov. 1991, pp. 449-462.

Jones, et al., "Talking Text and Talking Back: "My BFF Jill" from Boob Tube to YouTube", In Journal of Computer-Mediated Communication, vol. 14, Issue 4, Jul. 1, 2009, pp. 1050-1079.

Kavada, Anastasia, "Engagement, bonding, and identity across multiple platforms: Avaaz on Facebook, YouTube, and MySpace", In MedieKultur: Journal of media and communication research, vol. 28, Issue 52, Mar. 30, 2012, 21 Pages.

Khan, Laeeq M., "Social media engagement: What motivates user participation and consumption on YouTube?", In Journal of Computers in Human Behavior,Jan. 1, 2017, pp. 236-247.

Kim, et al., "Crowdsourcing step-by-step information extraction to enhance existing how-to videos", In Proceedings of the SIGCHI Conference on Human Factors in Computing Systems, Apr. 26, 2014, pp. 4017-4026.

Kirk, et al., "Turn It This Way: Grounding Collaborative Action with Remote Gestures", In Proceedings of the SIGCHI Conference on Human Factors in Computing Systems, Apr. 28, 2007, pp. 1039-1048.

Lajoie, et al., "Computers as cognitive tools", In Journal of Computing in Higher Education, Mar. 1995.

Lee, et al., "Detecting and Visualizing The Dispute Structure Of The Replying Comments In The Internet Forum Sites", In Proceedings of International Conference on Cyber-Enabled Distributed Computing and Knowledge Discovery, Oct. 10, 2010, pp. 456-463.

Leetiernan, Scott, "Fostering Engagement in Asynchronous Learning through Collaborative Multimedia Annotation", In Technical Report MSR-TR-2000-91, Interact, Jul. 1, 2001, 8 Pages.

Madden, et al., "A classification scheme for content analyses of YouTube video comments", In Journal of Documentation, vol. 69, Issue 5, Sep. 2, 2013, pp. 693-714.

Molyneaux, et al., "Exploring the gender divide on YouTube: An analysis of the creation and reception of vlogs", In American Communication Journal, vol. 10, Issue 2, Jan. 2008, 14 Pages.

Miu, Xiangming, "Towards effective video annotation: An approach to automatically link notes with video content", In Journal of Computers & Education, vol. 55, Issue 4, Dec. 1, 2010, pp. 1752-1763.

Pavel, et al., "VidCrit: Video-based asynchronous video review", In Proceedings of the 29th Annual Symposium on User Interface Software and Technology, Oct. 16, 2016, pp. 517-528.

Potthast, et al., "Opinion summarization of web comments", In Proceedings of the 32nd European Conference on Information Retrieval, Mar. 28, 2010, pp. 668-669.

Roll, Ido, "Learning at Scale", International Journal of Artificial Intelligence in Education, vol. 28, Issue 4, Dec. 2018, pp. 471-477.

Rotman, et al., "The 'WeTube' in YouTube—creating an online community through video sharing", In International Journal of Web Based Communities, vol. 6, Issue 3, Jan. 1, 2010, pp. 317-333.

Schultes, et al., "Leave a comment! An in-depth analysis of user comments on YouTube", 11th International Conference on Wirtschaftsinformatik, vol. 42, Feb. 27, 2013, pp. 659-673.

Siemens, George, "Connectivism : A learning theory for the digital age", Retreived From http://www.edtechpolicy.org/AAASGW/Session2/siemens_article.pdf, Jan. 5, 2005, 10 Pages.

Siersdorfer, et al., "How useful are your comments?: Analyzing and predicting YouTube comments and comment ratings", In Proceedings of the 19th International Conference on Worid Wide Web, Apr. 26, 2010, pp. 891-900.

Thomas, Matthew JW., "Learning within incoherent structures: The space of online discussion forums", In Journal of Computer Assisted Learning, vol. 18, Issue 3, Dec. 11, 2002, pp. 351-366.

Thompson, Clive, "How Khan Academy is changing the rules of education", In Wired Magazine , vol. 126, Jul. 15, 2011, pp. 1-5.

Tsang, et al., "Boom Chameleon: Simultaneous capture of 3D viewpoint, voice and gesture annotations on a spatially-aware display", In Proceedings of the 15th annual ACM symposium on User interface software and technology, Oct. 27, 2002, 10 Pages.

Vygotsky, Lev S., "Mind in society: The development of higher psychological processes", In Publication of Harvard University Press, Oct. 15, 1980, 170 Pages.

Welbourne, et al., "Science communication on YouTube: Factors that affect channel and video popularity", In Journal of Public Understanding of Science, vol. 25, Issue 6, Aug. 2016, 12 Pages.

Yoon, et al., "RichReview: Blending Ink, Speech, and Gesture to Support Collaborative Document Review", In Proceedings of the 27th Annual ACM Symposium on User Interface Software and Technology, Oct. 5, 2014, pp. 481-490.

Yuan, et al., "Automatic Video Genre Categorization Using Hierarchical SVM", In Proceedings of the IEEE International Conference on Image Processing, Oct. 8, 2006, pp. 2905-2908.

Zyto, et al., "Successful Classroom Deployment of a Social Document Annotation System", In Proceedings of the SIGCHI Conference on Human Factors in Computing Systems, May 5, 2012, pp. 1883-1892.

"How to Link to a Certain Time in a YouTube Video's Comment Box", Retrieved From: https://web.archive.org/web/20190412051657/

(56) References Cited

OTHER PUBLICATIONS https://www.wikihow.com/Link-to-a-Certain-Time-in-a-YouTube-Video's-Comment-Box, Apr. 12, 2019, 9 Pages.

"YouTube(TM) On Hover : : addOn.com", Retrieved From: https://web.archive.org/web/20180713134812/https://addOn.com/youtube-hover.html, Jul. 13, 2018, 4 Pages.

Ahmed, Waqas, "Video pinner for Chrome: Keep You Tube Videos in View as you Scroll Down the Comments", Retrieved From: https://www.addictivetips.com/web/keep-youtube-videos-in-view-as-you-scroll-down-comments-chrome/, Nov. 13, 2013, 1 Page.

"International Search Report and Written Opinion Issued in PCT Application No. PCT/US2020/025632", dated Jun. 24, 2020, 12 Pages.

"Final Office Action Issued in U.S. Appl. No. 16/389,807", dated Sep. 30, 2020, 21 Pages.

"Non Final Office Action Issued in U.S. Appl. No. 16/389,807", dated Jun. 24, 2022, 25 Pages.

"Non Final Office Action Issued in U.S. Appl. No. 16/389,807", dated Apr. 1, 2021, 16 Pages.

"Non Final Office Action Issued in U.S. Appl. No. 16/389,807", dated Apr. 6, 2020, 14 Pages.

"Non Final Office Action Issued in U.S. Appl. No. 16/389,853", dated Apr. 9, 2020, 16 Pages.

"Notice of Allowance Issued in U.S. Appl. No. 16/389,853", dated Sep. 23, 2020, 9 Pages.

"Non Final Office Action Issued in U.S. Appl. No. 16/389,864", dated Aug. 19, 2020, 14 Pages.

"Notice of Allowance Issued in U.S. Appl. No. 16/389,864", dated Feb. 3, 2021, 7 Pages.

"Final Office Action Issued in U.S. Appl. No. 16/389,807", dated Dec. 29, 2021, 23 Pages.

"First Office Action and Search report Issued in Chinese Patent Application No. 202080029863.5", dated Sep. 2, 2022, 15 Pages.

Li, et al., "Classification of General Audio Data for Content-Based Retrieval", In Journal of Pattern Recognition Letters, vol. 22, Issue 5, Apr. 2001, pp. 533-544.

"International Search Report and Written Opinion Issued in PCT Application No. PCT/US2020/025616", dated Jun. 3, 2020, 10 Pages.

"International Search Report and Written Opinion Issued in PCT Application No. PCT/US20/025847", dated Jul. 17, 2020, 14 Pages.

"International Search Report and Written Opinion Issued in PCT Application No. PCT/US20/025851", dated Jul. 13, 2020, 16 Pages.

U.S. Appl. No. 16/389,807, filed Apr. 19, 2019.

"Notice of Allowance Issued in U.S. Appl. No. 16/389,807", dated Jan. 25, 2023, 10 Pages.

"Office Action Issued in Chinese Patent Application No. 202080029718.7", dated Feb. 18, 2023, 14 Pages.

"Notice of Allowance Issued in Chinese Patent Application No. 202080029863.5", dated Feb. 12, 2023, 4 Pages.

"Office Action Issued in European Patent Application No. 20721340.6", dated Mar. 1, 2023, 8 Pages.

"Notice of Allowance Issued in Chinese Patent Application No. 202080029718.7", dated Jul. 11, 2023, 4 Pages.

"First Examination Report Issued in Indian Patent Application No. 202147053009", dated Jul. 27, 2023, 8 Pages.

"Office Action Issued in Indian Patent Application No. 202147053005", dated Aug. 8, 2023, 8 Pages.

* cited by examiner

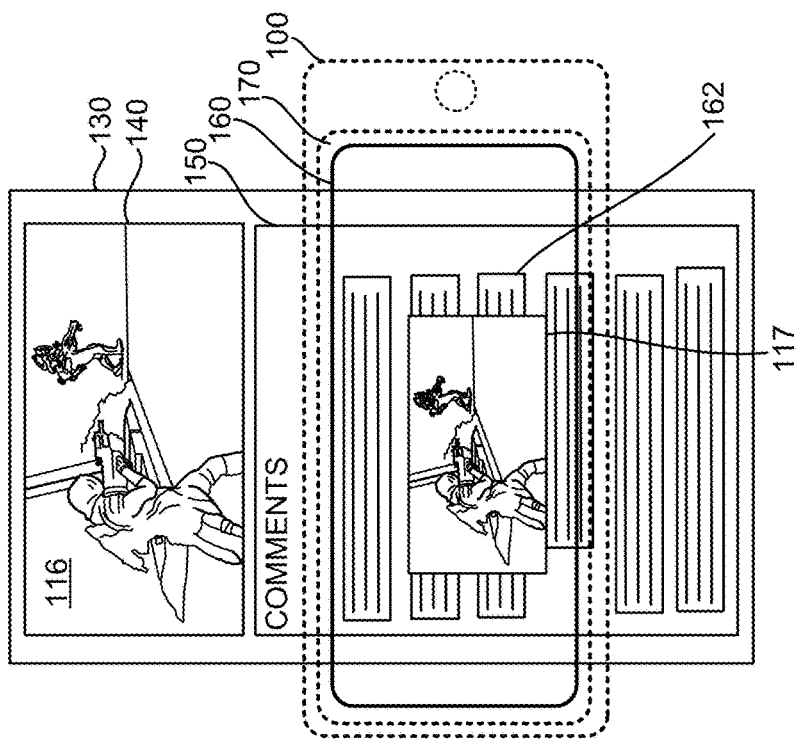
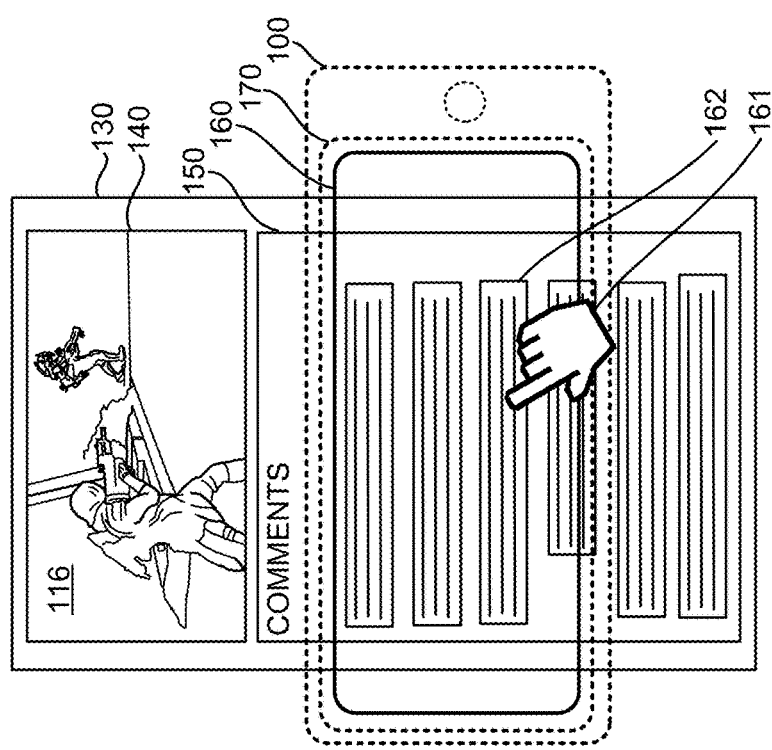
FIG. 1

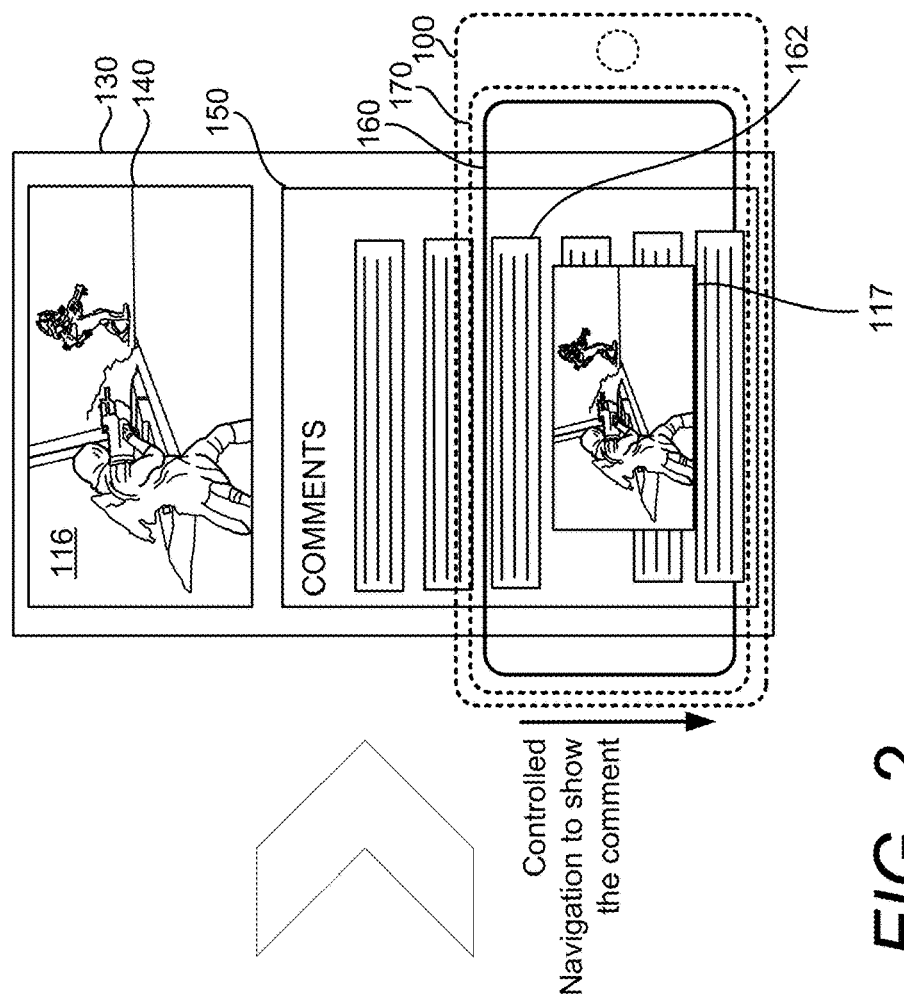
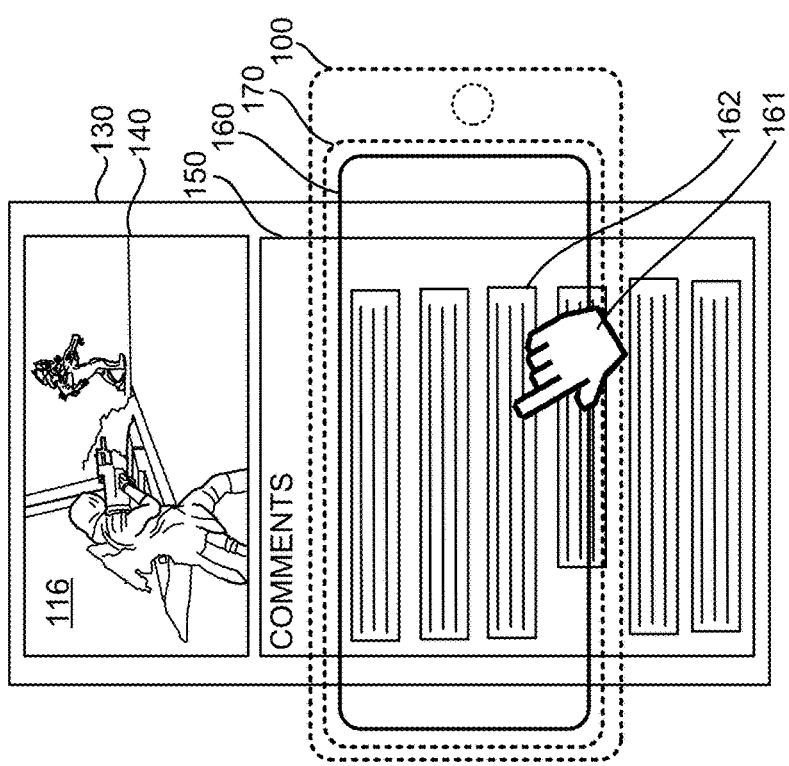
FIG. 2

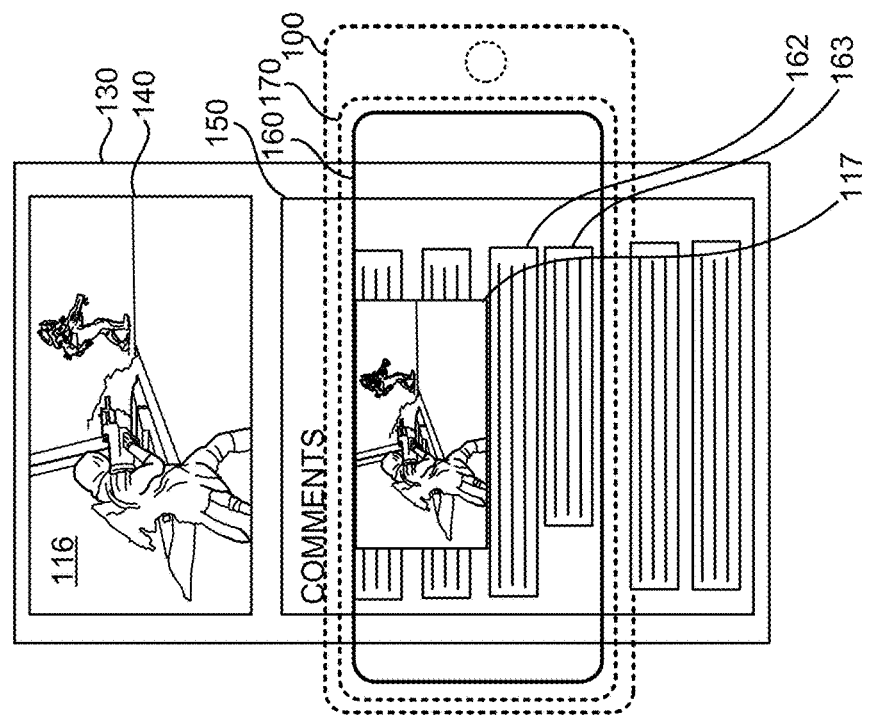
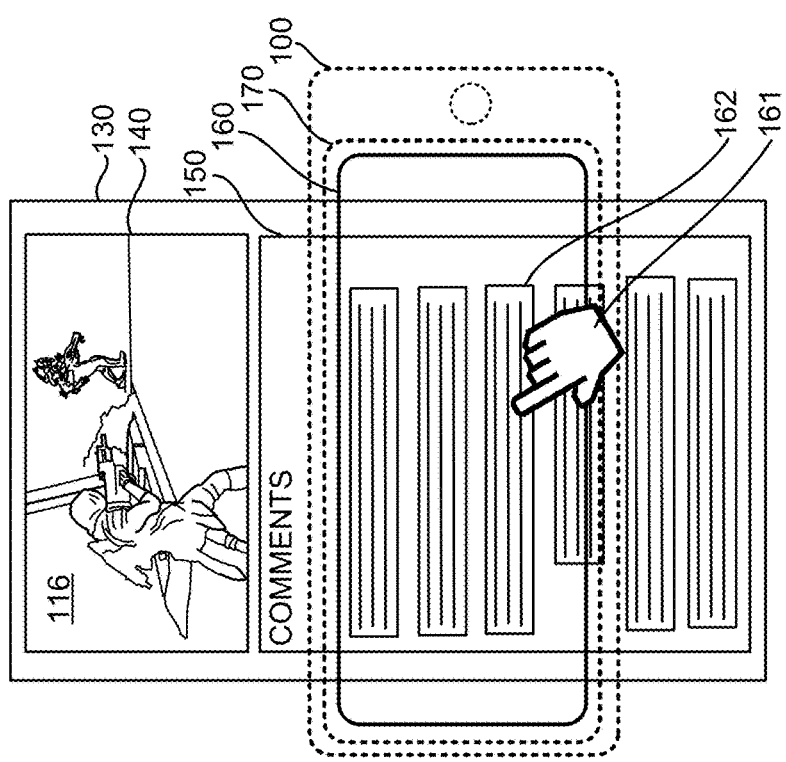
FIG. 3

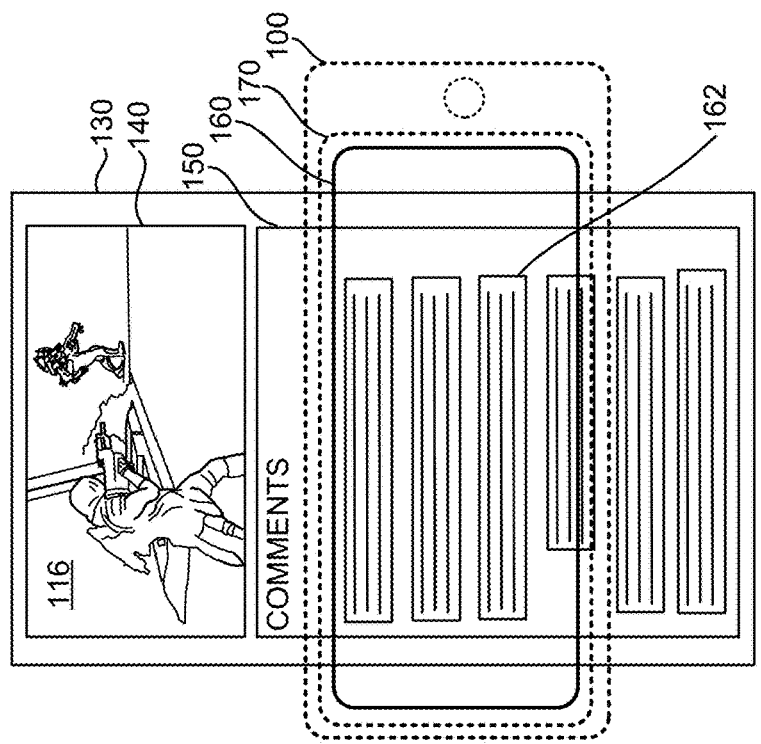
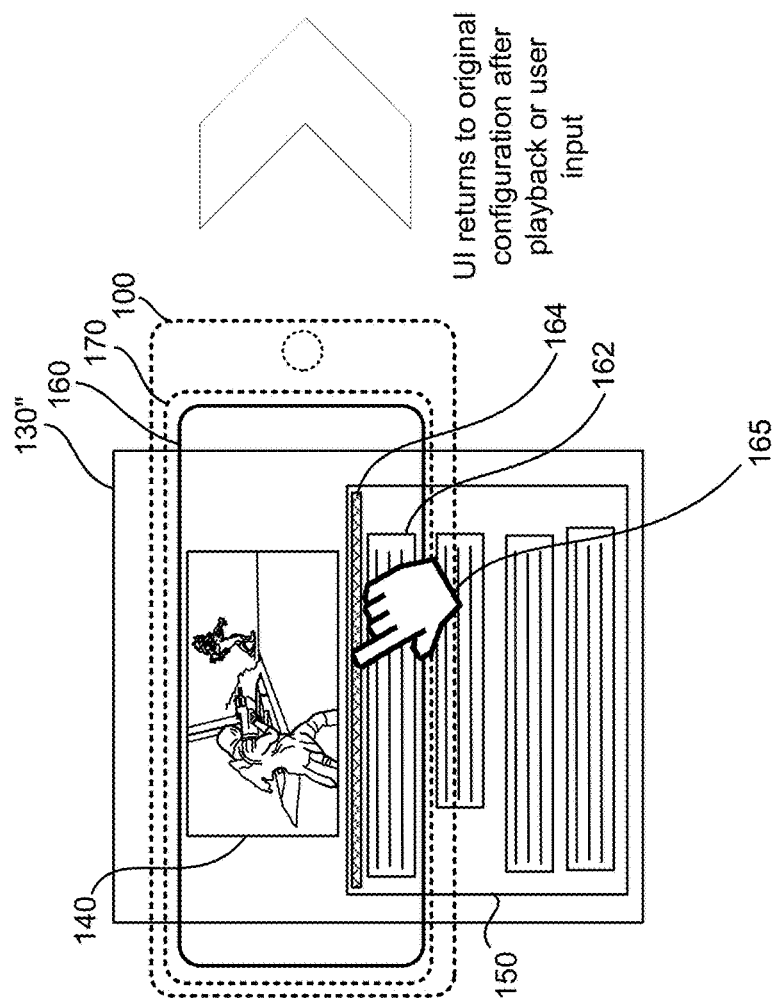
FIG. 5

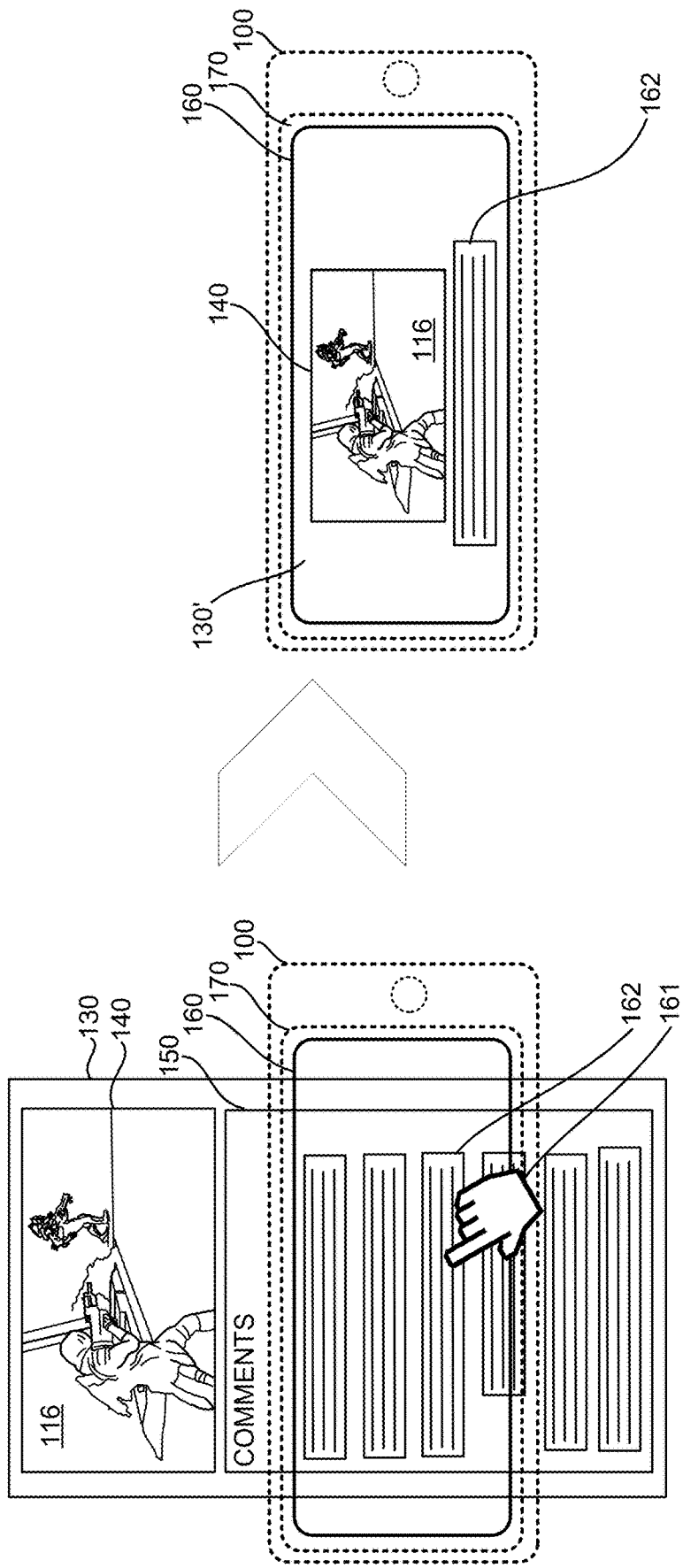

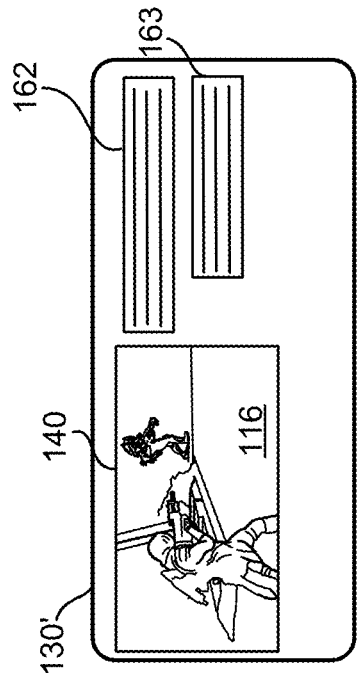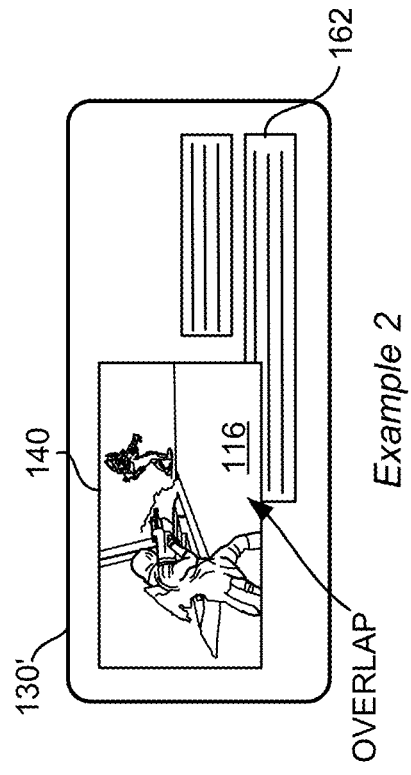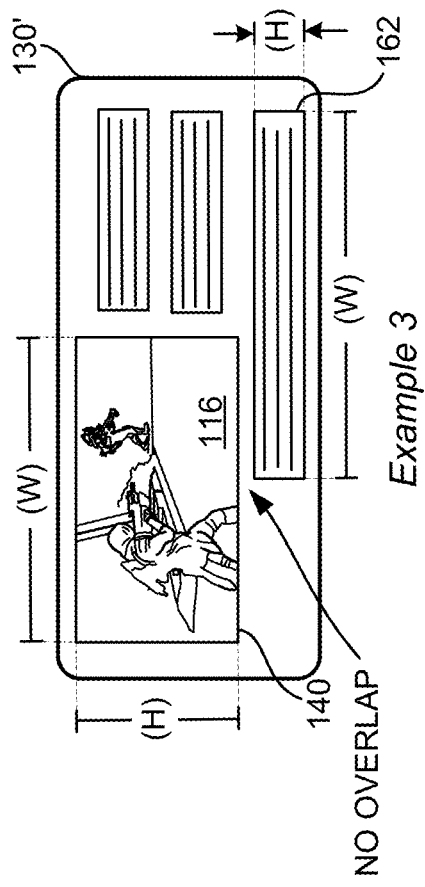
FIG. 6B

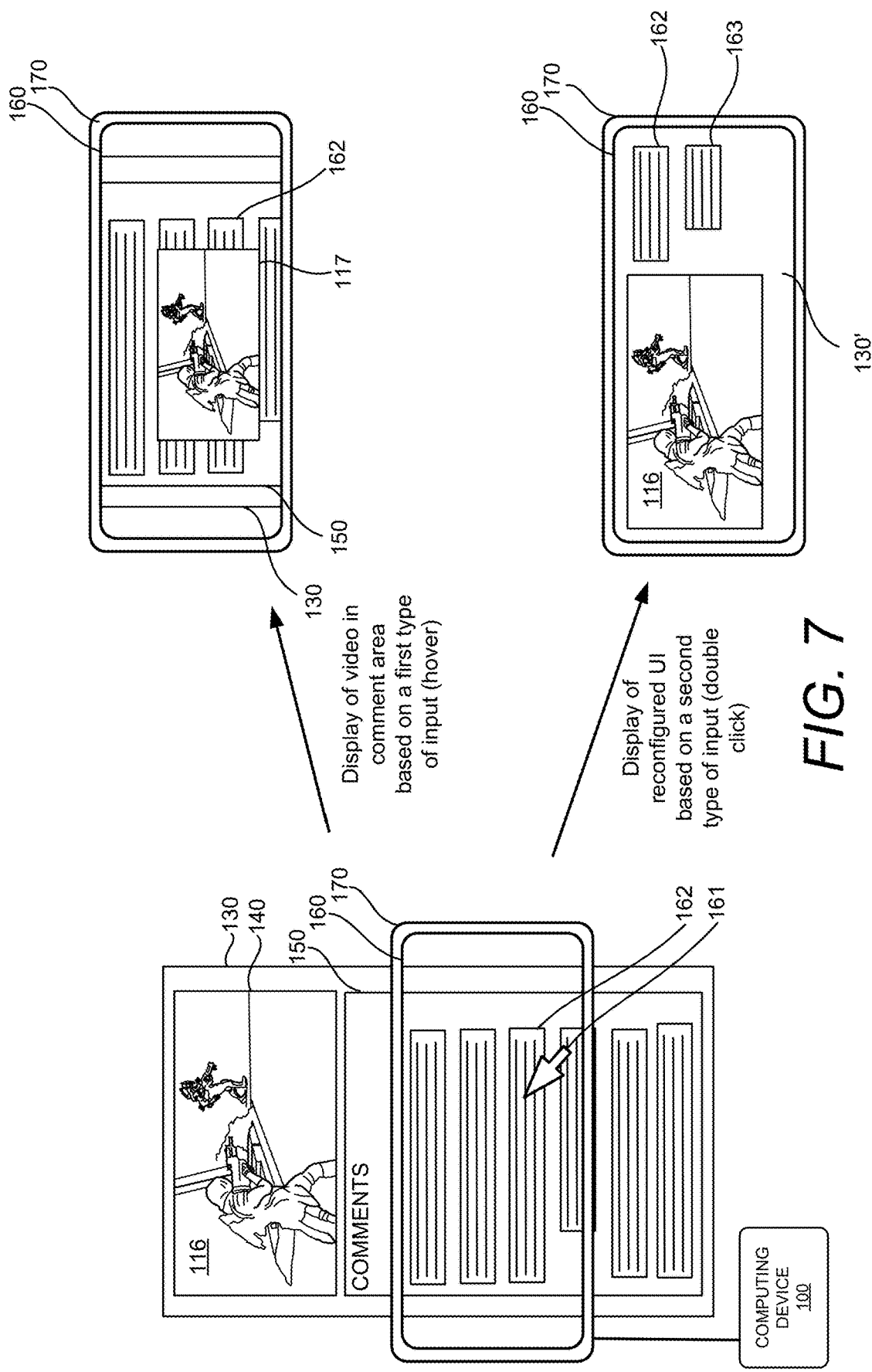

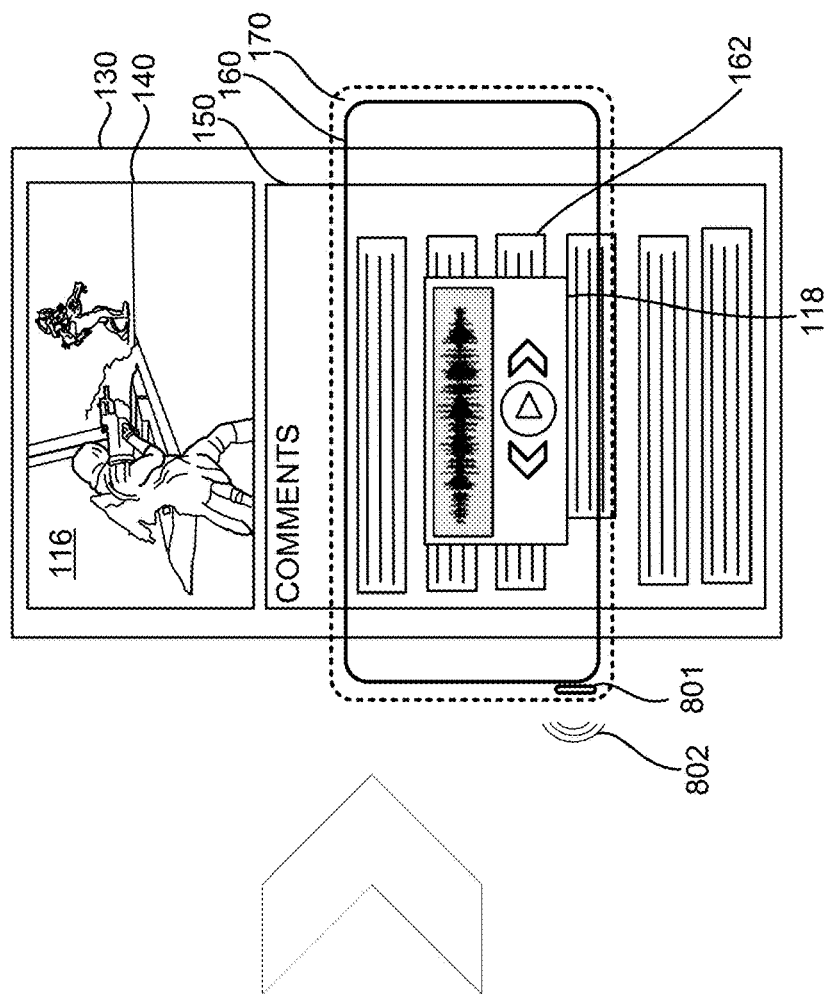
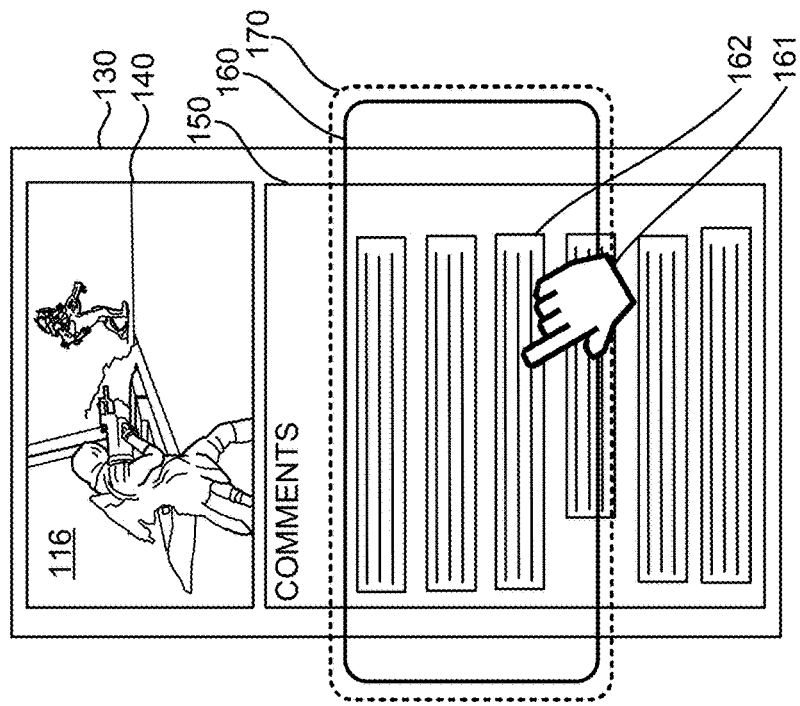
FIG. 8

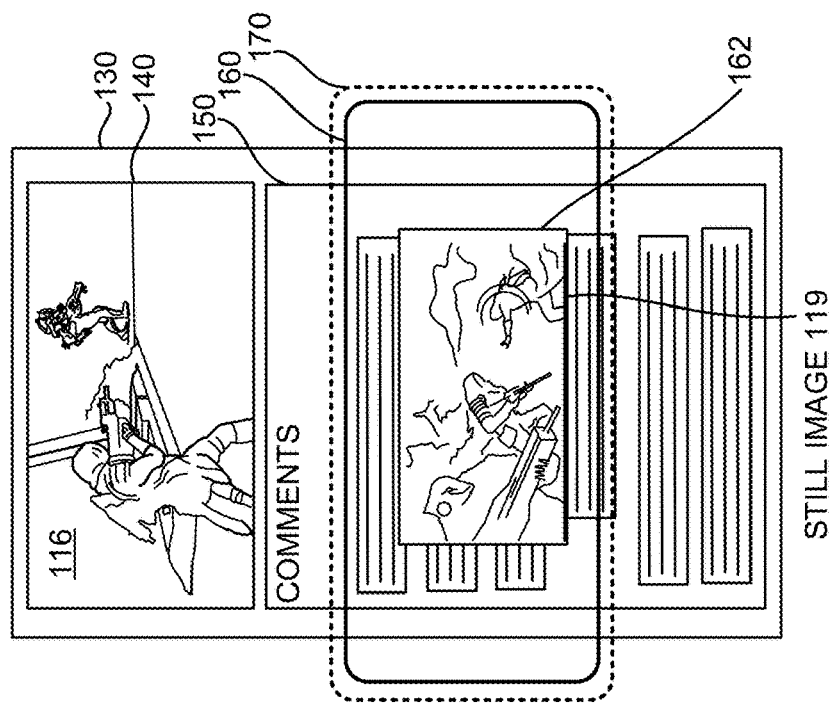
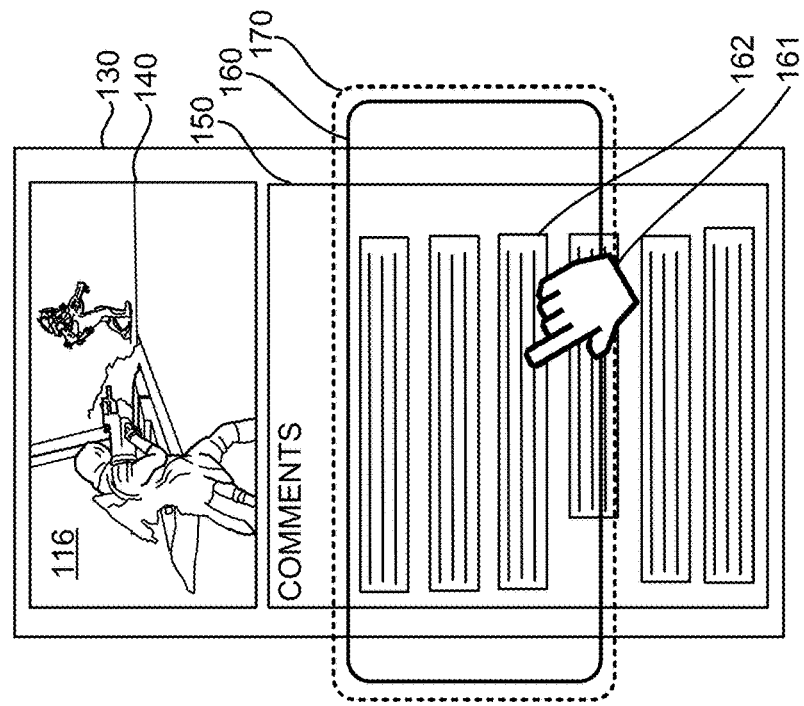
FIG. 9

CONTEXTUALLY-AWARE CONTROL OF A USER INTERFACE DISPLAYING A VIDEO AND RELATED USER TEXT

BACKGROUND

Commenting on videos is becoming popular and ubiquitous on many social, educational, and recreational platforms. Many video-based commenters refer to the video content to contextualize and specify their messages. Commenters can refer to visual entities or specific sound bites in a number of ways. For instance, users can refer to a sound or a quote of a person at a particular time or provide a timestamp, etc. In some systems, users can include a link to their comment and allow users to view a video starting at a particular point in time.

Although existing systems provide a platform for users to provide comments, user interfaces that are used today are simplistic in nature and do not provide tools for optimizing the user experience, both from the commenter's point of view and the viewer's perspective. For instance, in some existing systems, when viewers select a video link associated with a comment, current systems often cause the user interface to scroll away from the comment section in order to display the selected video. This feature causes a number of inefficiencies and complications. In particular, when interacting with existing systems, users cannot maintain a view of the comments when they select a comment to view a video. This does not allow users to continually view comments they are interested in while concurrently watching the related video. This can cause a number of inefficiencies by requiring users to scroll back and forth between the comments section and the video section of a user interface, which can be extremely difficult in situations where there are hundreds or thousands of comments. This type of navigation is highly inefficient with respect to the user's productivity and computing resources.

It is with respect to these and other technical challenges that the disclosure made herein is presented.

SUMMARY

The techniques disclosed herein provide improvements over existing systems by enabling computing devices to display video content within a comment section of a user interface. When users invoke the display of a video by selecting a link to the video within a comment section of a user interface, a system can control a navigational position of a user interface to concurrently display selected comments within the comment section and also display the video within the comment section.

In one illustrative example, a system can display a user interface having a video display area and a comment section. In some scenarios, a user interface may be navigationally positioned to show the comment section within a viewing area of a display device, and such a position may place the video display area outside of the viewing area of a display screen, e.g., the scroll position of a webpage may leave the video off-screen. In such a scenario, when a system receives a user input indicating a selection of a comment displayed within the comment section, the system can generate a rendering of the video content for display within the comment section.

The techniques described herein can lead to more efficient use of computing systems. In particular, by controlling aspects of a user interface to ensure the concurrent display of a video and select comments, a system can improve a number of efficiencies with respect to user productivity and promote more efficient use of computing resources. The systems presented herein mitigate the need for users to navigate manually throughout a user interface to look at particular comments during video playback. Elimination or mitigation of a manual navigation process leads to more efficient use of computing resources, such as memory usage, network usage, and processing resources, since it can mitigate the time a person needs to spend on a computer to navigate through a large page. In addition, the system can enhance user engagement by mitigating the need for a cumbersome manual user interface navigation process of a page containing a large volume of comments.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 illustrates an example process involving a computing device that can control the navigation of a user interface displaying a video display area and a comment section.

FIG. 2 illustrates an example process involving a computing device that can control the navigation of a user interface to display a selected comment concurrently with video content associated with the comment.

FIG. 3 illustrates an example process involving a computing device that can control the navigation of a user interface to display a selected comment and a related comment concurrently with video content associated with the comment and the related comment.

FIG. 5 illustrates an example process involving a computing device that can transition back from a reconfigured user interface to an original user interface.

FIG. 6A illustrates an example process involving a computing device that can generate a customized user interface to concurrently display a comment and video content associated with the comment.

FIG. 6B illustrates examples of customized user interfaces for concurrently displaying a comment and video content associated with the comment.

FIG. 7 illustrates an example process involving a computing device that can generate different types of user interfaces depending on a type of user input.

FIG. 8 illustrates an example process involving a computing device that can generate a rendering of an audio user interface element concurrently with an associated comment.

FIG. 9 illustrates an example process involving a computing device that can control the navigation of a user interface displaying a still image of video content concurrently with a related comment.

DETAILED DESCRIPTION

Figure 4:
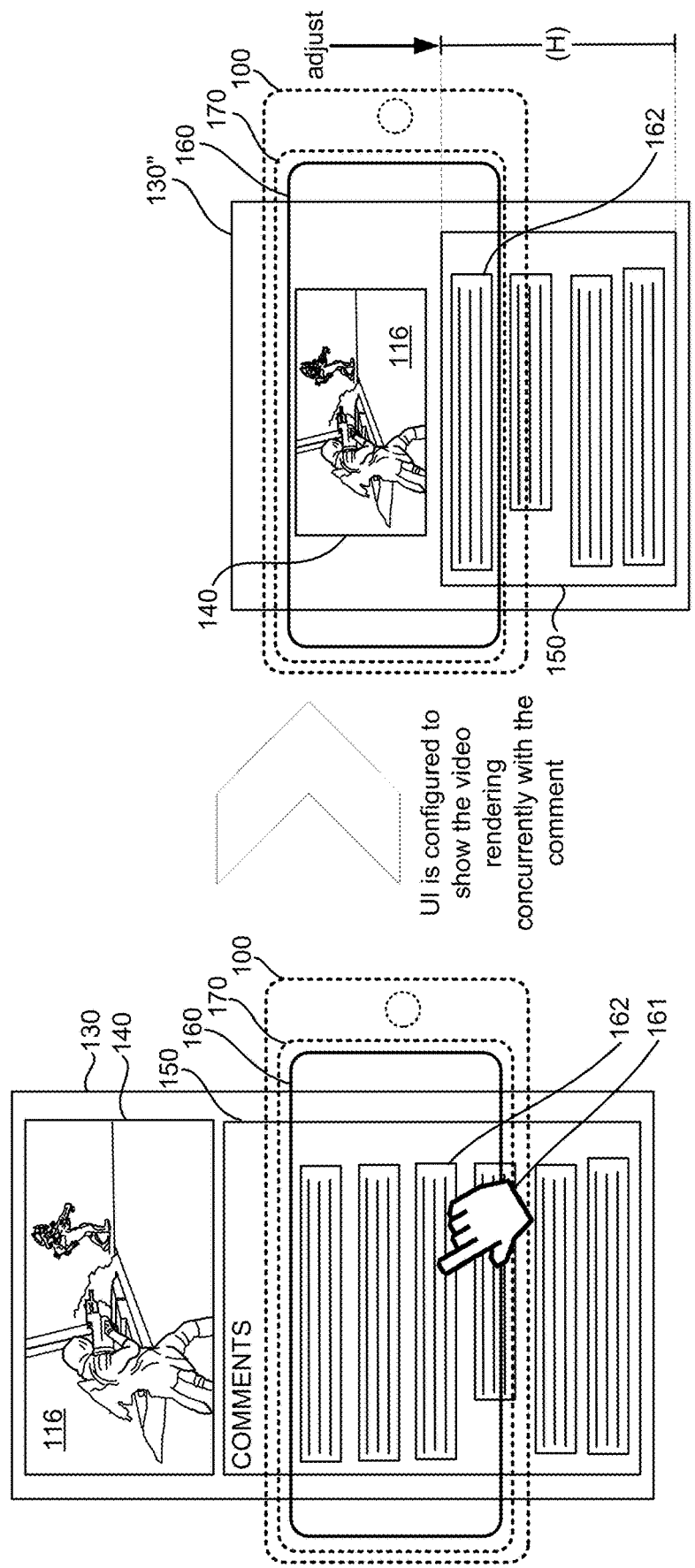
FIG. 4 illustrates an example process involving a computing device that can generate a reconfigured user interface to concurrently display a comment and video content associated with the comment.

FIG. 1 illustrates an example process involving a computing device 100 that can control and enhance the navigational position of a user interface displaying a video display area and a comment section. The example illustrated in FIG. 1 shows two stages of a process for controlling the navigational position of the user interface 130 rendering video content in a video display area 140 and a comment section 150. The first stage of the process is shown on the left side of the figure and the second stage of the process is shown on the right side of the figure. This figure is arranged to illustrate how portions of the user interface 130 can be displayed to a user. Specifically, for illustrative purposes, portions of the user interface 130 that are within the viewing area 160 of a display device 170, e.g., a screen, can be viewed by a user of the device. However, for illustrative purposes, portions of the user interface 130 that are not drawn within the viewing area 160 are "off-screen" and not viewable by the user.

As shown in the first stage of the process, the computing device 100 can display a user interface 130 comprising a video display area 140 and a comment section 150. As shown, an initial navigational position of the user interface 130 displays the comment section 150 within a viewing area 160 of a display device 170, and the rendered video content 116 within the video display area 140. The position of the user interface 130 locates the video display area 140 outside of the viewing area 160. The video display area 140 and the comment section 150 are distinct from one other, and thus, a rendering 116 of the video content, is "off-screen" and not viewable by a user of the computing device 100. As can be appreciated, the position of the user interface 130 can be manipulated by a user interaction to scroll the user interface up or down to view parts of the user interface 130 within the viewing area 160 of the display device 170. The comment section 150 is also referred to herein as a "text field 150" or a "text section 150." The comment section 150 can include any section of a user interface comprising text. For instance, the comment section 150 one can be a part of a word processing document, a OneNote file, a spreadsheet, a blog, or any other form of media or data that can cause a computer to render text in conjunction with a rendering of a video.

Also shown in FIG. 1, in the first stage of the process, the computing device 100 can receive a user input 161 indicating a selection of a comment 162 displayed within the comment section 160. The user input 161 can be based on a user interaction with a touchscreen or any other mechanism suitable for selecting the comment 162. In some configurations, user input 161 can be a voice command received by a microphone of the computing device 100. In some configurations, the user input 161 can be received by a camera or imaging sensor of the computing device. Such an embodiment allows a user to provide a gesture to select a comment 162. For example, a user can point to a particular comment within a user interface. It can also be appreciated that the selection of a comment 162 can include the selection of at least a portion of a comment. Thus, if a user selects a word or any other symbol or character associated with a displayed video, such a user input can cause the computing device 102 perform one or more actions such as a display of a video, rendering of an audio output or display of other types of media, such as a still image or other graphical elements, while controlling the navigational position of the user interface to continually display the selected word, symbol, or character.

As shown in the second stage of the process, in response to receiving the user input, the computing device 100 can generate a second rendering 117 of the content for display within the comment section 150, wherein the user interface 130 is configured to maintain the position of the user interface 130 to locate the comment section 150 within a viewing area 160 of a display device 170, while displaying the second rendering 117 within the viewing area 160 of a display device 170.

The examples provided herein are for illustrative purposes and are not to be construed as limiting. It can be appreciated that any type of computing device can be utilized to implement the techniques disclosed herein. For instance, although a mobile device is utilized in some of the examples depicted herein, any computing device in communication with a display device, e.g., a monitor, with a display area can be used to implement the disclosed techniques. For illustrative purposes, the display area of the display device is considered to be the surface of the display device that can generate light for displaying rendered images.

FIG. 2 illustrates an example process involving a computing device 100 that can control the navigational position of a user interface 130 to display a selected comment 162 concurrently with a rendering of video content 117 associated with the comment 162 in the viewing area 160. In this example, in the second stage of the process, the computing device 100 can also automatically scroll, or otherwise position, the user interface 130 to enable the computing device 100 to concurrently display rendered video content 117 such that it does not obscure or block the display of the selected comment 162.

In the example shown in FIG. 1, the user interface may be positioned such that the second rendering 117 of the video content within the comment section may block at least a portion of the selected comment 162. In the example shown in FIG. 2, the system can respond to the user input to control the navigational position of the user interface 130 to allow the comment to be concurrently displayed in its entirety with the second rendering 117 in the viewing area 160. This control navigation can also select a position for the second rendering 117 such that it mitigates the overlap with any comment in the comment section. The system can analyze coordinates for the comments and coordinates of the rendered video 117 to minimize the amount of overlap in the viewing area 160. The size of the video rendering may also be adjusted to minimize the amount of overlap between the video rendering and one or more comments. The video rendering may be minimized to a predetermined size which may depend on one or more user settings, or other factors such as a resolution of the video data.

In some configurations, the computing device 100 can scroll the user interface 130 in any direction, e.g., up, down, left, or right, to enable the computing device to concurrently display rendered video content 117 such that it does not obscure or block the display of the selected comment 162. Any suitable technique for detecting the position of the user interface element, such as the rendering of the video content 117 and or a comment 162, can be utilized to a momentous aspect of the present disclosure. For instance, the coordinates of the comment 162 can be analyzed by the computing device 100. The computing device can then determine coordinates for the rendering of the video content 117 based on the coordinates of the comment 162. The computing device 100 can then position the rendering of the video content 117 such that the coordinates of the video content 117 have no more than a threshold level of overlap with respect to the coordinates of the comment 162. The threshold level of overlap can allow no overlap up to any predetermined level of overlap. In addition, the computing device 100 can determine coordinates for the rendering of the video content 117 such that the video content 117 is rendered within the viewing area 160 of the display device 170.

FIG. 3 illustrates an example process involving a computing device 100 that can control the navigation of the user interface 130 to display a selected comment 162 and a related comment 163 concurrently with video content associated with the comment 162 and the related comment 163. This embodiment enables a computing device 100 to analyze various comments to allow the display of comments having a threshold level of relevancy with respect to the rendered video content 117. In one illustrative example, a related comment may include any replies to a selected comment 162.

As shown in FIG. 3, the computing device 100 can apply a controlled navigation to show the comment 162 and the related comment 163. This can be done by scrolling the user interface 130 to a position that allows for the display of the comment 162 and the related comment 163. At the same time, the rendering of the video content 117 is positioned such that the rendering of the video content 117 has a threshold level of overlap, or no overlap, with respect to the comment 162 and the related comment 163.

FIG. 4 illustrates an example process involving a computing device 100 that can generate a reconfigured user interface 130" to concurrently display a selected comment 162 and a rendering of video content associated with the comment 162. In this example, the computing device 100 can modify dimensions of the comment section 150 to allow the video display area 140 to render the video content 116 concurrently with the comment 162.

The reconfigured user interface 130" can be implemented in a number of ways. In this particular example, the top border of the comment section 150 is modified such that comments above the selected comment 162 are hidden, and the selected comment 162 is displayed at the top of the comment section 150. As shown by the arrow in FIG. 4, the top border of the comment section 150 is adjusted to enable the display area 140. Although the example of FIG. 4 illustrates one example where a dimension, e.g., the height (H) of the comment section 150 is modified, it can be appreciated that a reconfigured user interface 130" can involve a modification of any shape or size of a graphical element to allow a concurrent review of the video display area 140 and a selected comment 162.

FIG. 5 illustrates an example process involving a computing device that can transition back from a reconfigured user interface to an original user interface. In continuing the example from FIG. 4, FIG. 5 illustrates a two-step process that starts with the reconfigured user interface 130". In this example, the reconfigured user interface 130" comprises a selectable graphical element 164 that indicates that the comment section 150 is collapsed. The reconfigured user interface 130" is also configured to receive user input 165 at the selectable graphical element 164. In response to the user input 165, the computing device 100 can revert back to the original user interface 130, which displays the selected comment 162 and the viewing area 160 and places the video display area 140 off-screen.

Although this example utilizes a touch-based user input, it can be appreciated that this embodiment can involve a voice command or any other type of input to revert the display back to the original user interface 130. It can also be appreciated that this embodiment can involve other types of graphical elements other than the selectable graphical element 164. For instance, the top border of the comment section 150 can be bolded, shaped, colored, or otherwise modified to indicate the collapsed status of the comment section 150.

In addition to providing a reconfigured user interface 130", the computing device 100 can generate a custom user interface 130'. In such an embodiment, the computing device can generate an entirely new user interface configuration that shows a rendering of content within a display area 140 concurrently with at least one comment, such as the selected comment 162.

FIG. 6A illustrates an example process involving a computing device that can generate a customized user interface 130' to concurrently display a selected comment 162 and video content associated with the comment 162. In this illustrative example, the selected comment 162 is positioned below the video display area 140 within the viewing area 160. Also shown, the customized user interface 130' is arranged such that the display of the rendered video 116 does not obscure or otherwise block the display of the selected comment 162 or any other comment. This example is provided for illustrative purposes and is not to be construed as limiting. The customized user interface 130' can have the comment 162 in any position, orientation, or size relative to the rendered video 116.

FIG. 6B illustrates examples of customized user interfaces 130' configured to concurrently display a comment and video content associated with the comment. In general, the display area 140 of the video content and the selected comment 162 can be in any arrangement. For instance, as shown in Example 1, a selected comment 162 and a related comment 163 can be oriented next to the display area 140 that includes a rendering of the video content 116.

In some configurations, the display area 140 of the video content 116 can have a threshold level of overlap with respect to the selected comment 162. For illustrative purposes, the threshold level of overlap can include zero overlap up to any predetermined level of overlap, which may be defined in a user preference file or any other contextual data based on user activity. In other embodiments, the threshold level of overlap may be based on the amount of text of the comment 162 that is covered. For instance, the threshold level of overlap may allow for some overlap so long as the text can be interpreted. Thus, as shown in Example 2, an amount of overlap may allow the video to cover or otherwise obscure some words of the comment 162 while still enabling a user to understand the nature of the comment. Thus, a user interface may have a threshold level of overlap when certain keywords, such as "THE" and "A," and other conjunctive or transitional words are covered by the video rendering.

The system can also adjust the size and/or position of display elements to minimize or eliminate any overlap between the display area 140 and a comment 162. As shown in Example 3, the height (H) and width (W) of the display area 140 or at least one comment 162 can be adjusted to eliminate any overlap between the two graphical elements. In one illustrative example, the threshold level of overlap may be based on the content of the comment. If it is determined that the comment includes a threshold percentage of predetermined keywords, the system may determine that the threshold level of overlap is zero and the system may arrange the graphical elements accordingly, as shown in Example 3.

Similar to the example shown in FIGS. 4 and 5, the customized user interfaces can also be configured to revert back to an original user interface. In such an embodiment, the computing device 100 can revert the display of the customized user interface 130' back to the original user interface 130 in response to a user input. In some configurations, the computing device 100 can also revert the display the display of the customized user interface 130' back to the original user interface 130 based on other events, such as a timer, or other criteria.

In some embodiments, the computing device 100 can take different actions depending on the type of input that is provided by user. FIG. 7 illustrates an example process involving a computing device 100 that can generate different types of user interfaces depending on a type of user input. In this example, the computing device 100 can display a second rendering 117 of the video content within the comment section based on a first type of user input. The first type of user input can be any type of input including passive inputs such as a hover of the cursor 161, or any other type of suitable input. As shown, the user interface 130 can transition from the example on the left side of the diagram to the user interface 130 in the upper right corner of FIG. 7 in response to a first type of user input. The user interface 130 in the upper right corner of FIG. 7 shows a rendering of the video content 117 within the comment section 150.

Also shown in FIG. 7, the computing device can take other action based on a second type of user input. In this example, based on a second type of user input, which can include a more active type of input, such as a hover and click or a hover and double-click, the computing device 100 can generate a customized user interface 130'. As shown, the user interface 130 can transition from the example on the left side of the diagram to the customized user interface 130' in the lower right corner of FIG. 7 in response to a second type of user input. The user interface 130' in the lower right corner of FIG. 7 shows a rendering of the video content 117 together with the selected comment 162 and comment 163.

These examples have been provided for illustrative purposes and are not to be construed as limiting. It can be appreciated that any type of user interface can be generated in response to various types of user inputs. For instance, in the example of FIG. 7, in response to the second type of user input, the computing device 100 can generate a reconfigured user interface 130', or any other user interface configuration that concurrently displays a selected comment 162 and a video associated with the selected comment 162.

In some configurations, the computing device 100 can render video content in a number of different formats and mediums. For instance, a link within the comment section 150 can be configured to play an audio clip associated with the video. In such an embodiment, as shown in FIG. 8, instead of rendering a video in response to a user selected of a comment 162, the computing device 100 can display an audio interface element 118 concurrently with an associated comment. The computing device 100 can also render an audio output 802 from a speaker 801 in response to a user selected of a comment 162. In some configurations, the computing device 100 can render the audio output 802 from the speaker 801 in response to a user selected of at least a portion of the comment 162 without displaying the audio interface element 118, while also controlling the position of the user interface 130 to display the comment section 150.

In another example, a link within the comment section 150 can be configured to display a still image captured from the video content. In such an embodiment, as shown in FIG. 9, instead of rendering a video in response to a user selection of a comment 162, the computing device 100 can display a still image from a particular point in time of the video content. The display of the image can be concurrently displayed with the associated comment, or otherwise displayed within the comment section 150 of the user interface 130.

Figure 10:
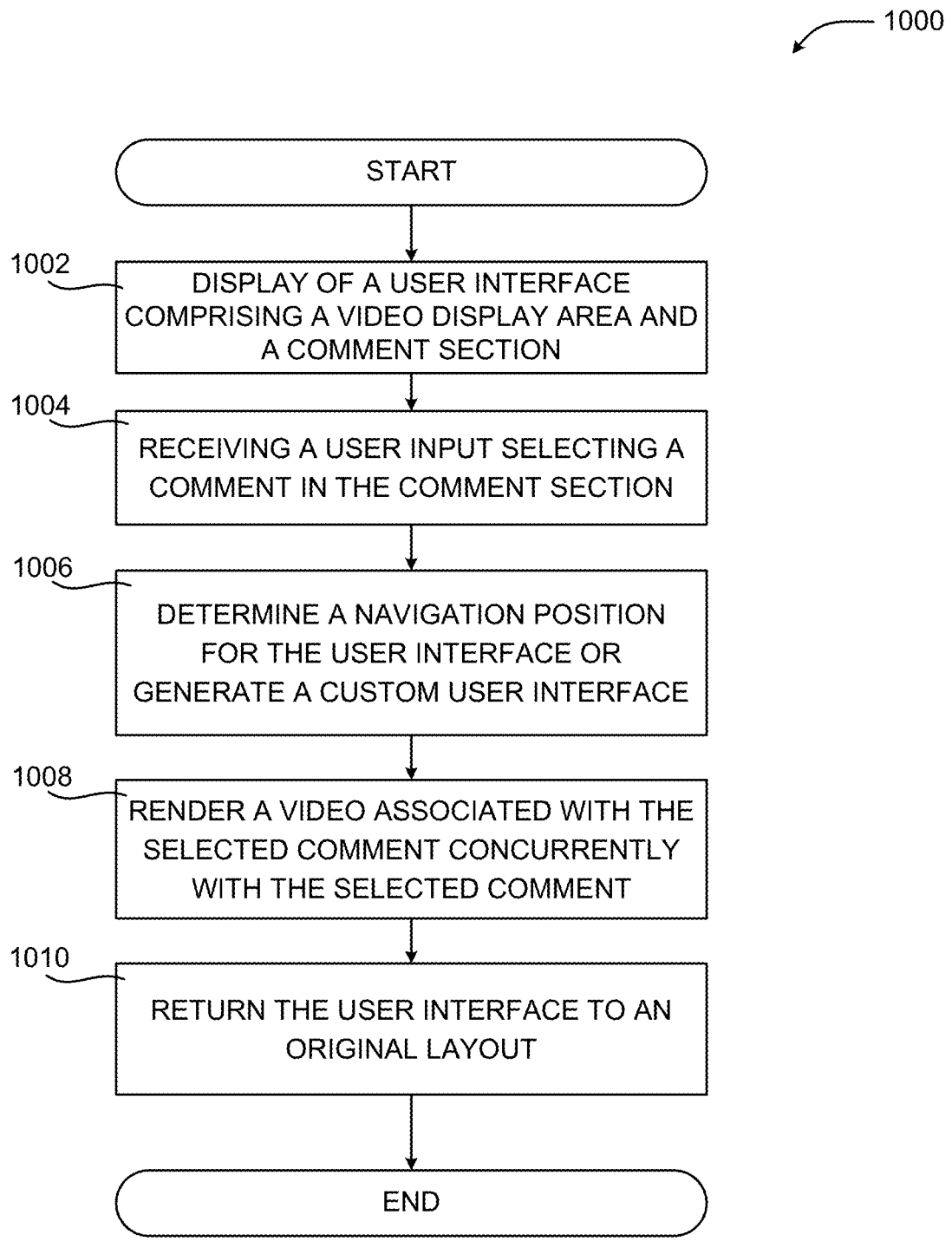
FIG. 10 is a flow diagram illustrating aspects of a routine for computationally efficient generation of spoken content of a video.

FIG. 10 is a diagram illustrating aspects of a routine 1000 for computationally efficient display of a video in a comment section of a user interface. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a video (e.g., live content, broadcasted event, recorded content, etc.) and/or a presentation UI that includes renderings of one or more participants of remote computing devices, avatars, channels, chat sessions, video streams, images, virtual objects, and/or applications associated with a video.

The routine 1000 begins at operation 1002, where the system can cause a display of a user interface 130 having a video display area and a comment section. One example of a user interface 130 is shown in FIG. 1. The video display area 140 can be configured to render a video 116. The comment section can include a number of comments. Each comment can include a link or other associated metadata that is configured to display a video rendering or a display of other media in response to user selection. The user interface 130 can be displayed on the client device such as a tablet, mobile phone, desktop computer, etc.

Next, at operation 1004, the system (such as the computing device 100) can receive a user input selecting a comment within the comment section. Since individual comments can be associated with some type of media by the use of a link or other metadata, in response to a user selection of a comment 162, the user interface 130 can generate a rendering of a video 117. The user selection can be made by any device such as a mouse, a touch surface device, voice input device, etc.

At operation 1006, the system can determine a navigation position for the user interface 130 or generate a custom interface or a reconfigured user interface in response to the user input. As described above, a navigation position may be selected based on the size and position of a rendering of a video, such as the second rendering 117 shown in FIG. 1. A position of the user interface 130 can be selected to allow a display of the second rendering 117 within a comment section of a user interface. In some configurations, the position of the user interface, such as a scroll position, may be selected to allow a concurrent non-overlapping display of the second rendering 117 of the video and the selected comment and/or related comments.

In other configurations, a rendering of a video related to a selected comment may be displayed with the selected comment in a reconfigured user interface that changes the size and shape of the comment section to enable the concurrent display of the video, such as the first rendering 116, and the selected comment. In another embodiment, a custom user interface may be generated to concurrently display a selected comment with an associated rendering of a video. Such an embodiment can arrange a layout of the selected comment and the associated video to accommodate a screen size of a computing device wherein the size and shape of the comment and the size and the shape of the video rendering can be adjusted to allow the user to view comments in addition to viewing a specific section of a rendered video.

Next, at operation 1008, the system can render a selected comment concurrently with an associated rendering of a video. Several examples are disclosed herein. As shown in FIG. 1, a second rendering 117 can be displayed within a comment section of the user interface. In another example, such as the example shown in FIG. 3, a scroll position can be selected to enable a display of the rendered video concurrently with a selected comment and other related comments.

As shown in FIG. 4, other embodiments enable the comment section to be modified such that the user interface can concurrently display a video rendering with at least one comment, including the selected comment 162. These examples are provided for illustrative purposes and are not to be construed as limiting. It can be appreciated that any position of the user-interface or any shape of rendered elements within the user interface can be modified to enable a system to concurrently display a video with a selected comment and/or other related comments.

In some aspects of operation 1008, the system can determine a particular scroll position of a user interface or reconfigure a user interface in response to different types of user inputs. For instance, as shown in FIG. 7, in response to a first type of input, such as a hover, the system may automatically display a video within a comment section of the user-interface. In response to a second type of input, such as a click or double-click selecting particular comment, the system may generate a customized user interface or a reconfigured user interface to show a rendering of a video together with one or more comments.

Next, at operation 1010, the system may return the user interface 130 to an original layout in response to one or more actions. For example, after the video playback has completed at operation 1008, if the system is displaying a customized user interface or a reconfigured user interface, the system may revert those displays back to an original interface upon conclusion of a video playback. An original interface for example is the user interface 130 shown on the left side of FIG. 1.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
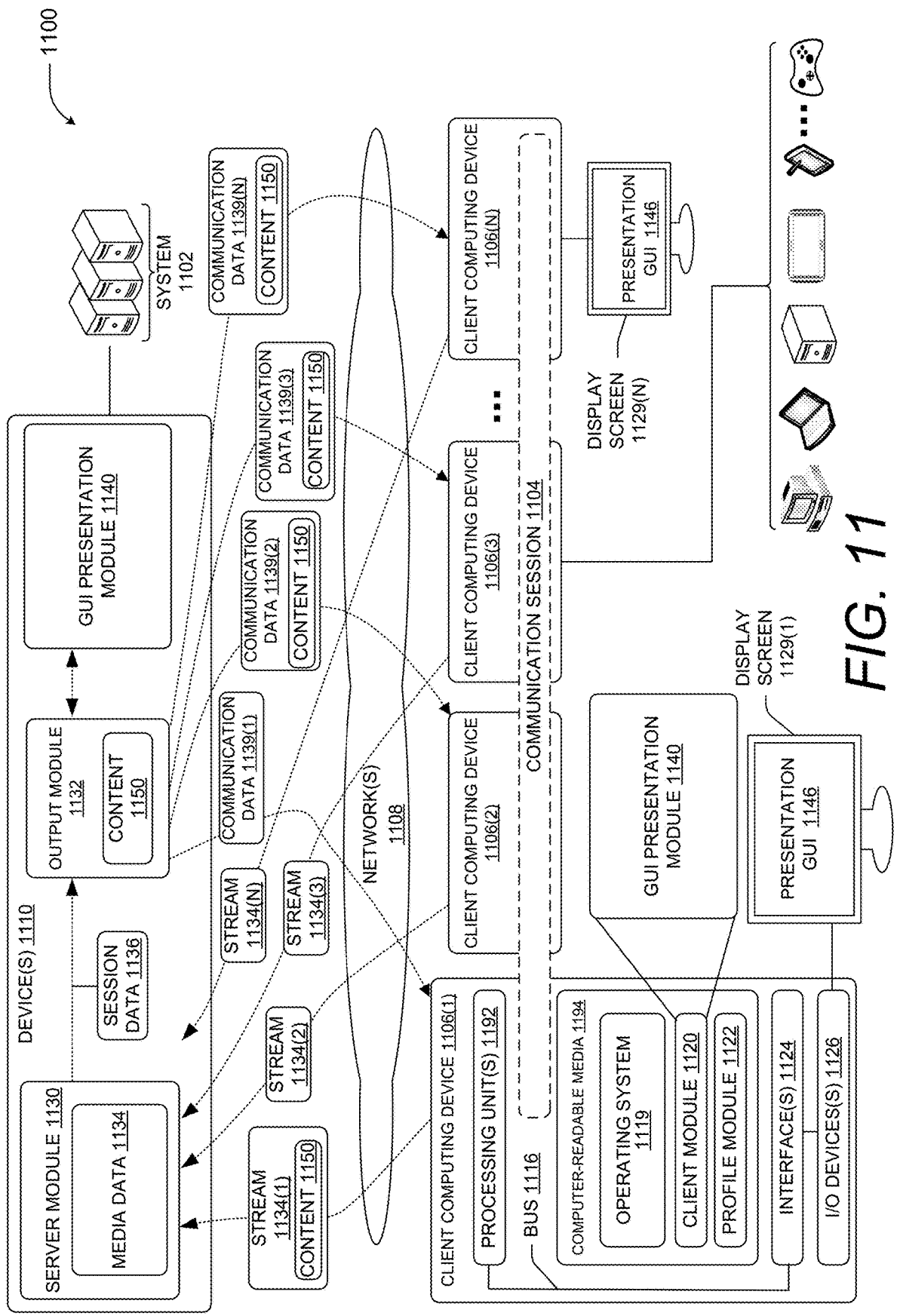
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. Although this embodiment illustrates a communication session 1104, can be appreciated that a communication session 1104 is not necessary for every embodiment disclosed herein. It can be appreciated that video streams can be uploaded by each client 1106 and that comments can be provided by each client 1106. It can be appreciated that any client 1106 can also receive video data and audio data from the server module 1130.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations. In the examples described herein, some embodiments may not utilize the communication session 1104. In some embodiments, a video may be uploaded to the server module 1130 from at least one of the client computing devices, e.g., 1106(1), 1106(2). When video content is uploaded to the server module 1130, any client computing device can access the uploaded video content and display that video content within a user interface such as those described above.

In the examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations. Each stream can also include text, audio and video data, such as the data communicated within a Channel, chat board, or a private messaging service.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as YOUTUBE, FACEBOOK, SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with, or inclusion of, input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) (each of which are also referred to herein as a "data processing system") may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134 (N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the GUI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, image, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
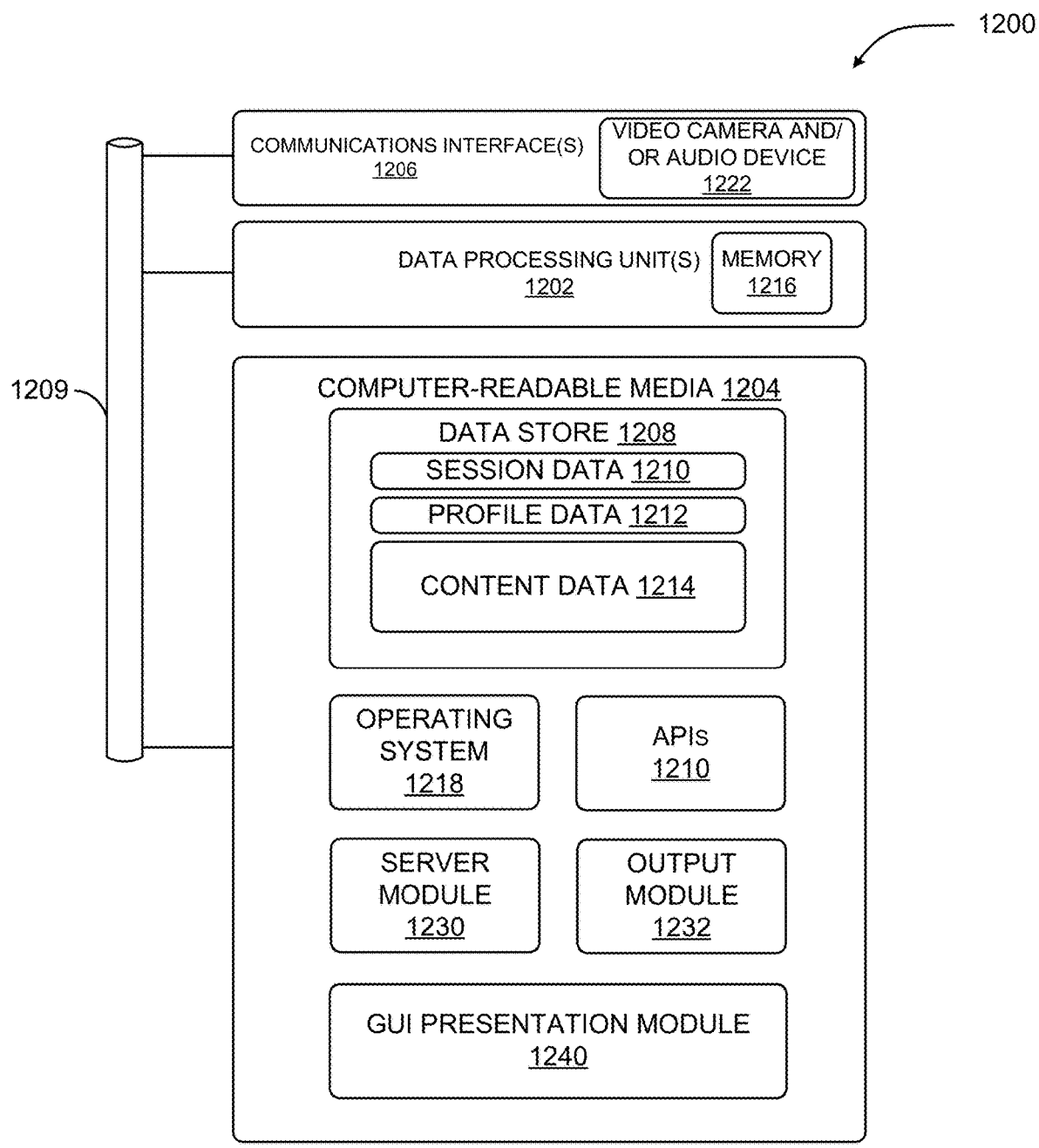
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s)

1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Other variations applied to the techniques disclosed herein can also be within the scope of the present disclosure. For instance, although the examples disclosed herein refer to a selection of a comment, the techniques disclosed herein include any user selection of a character, word, and image or any other graphical element associated with a comment or text. Thus, if a user selects a particular word or a particular image within a comment or any other text, the system can respond by displaying a video rendering within a user interface section containing the selected word, image, etc. It can be appreciated that each comment or phrase within a text section can also include multiple links. Thus, in the examples disclosed herein, a single comment can include multiple words, wherein individual words of the single comment each have a unique link.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1. A method for execution to be performed by a data processing system, the method comprising: causing a display of a user interface comprising a video display area and a comment section, wherein a position of the user interface displays the comment section within a viewing area of a display device, the position of the user interface locates the video display area displaying a rendering of content outside of the viewing area; receiving a user input indicating a selection of at least a portion of the comment displayed within the comment section; and in response to receiving the user input, generate a second rendering of the content for display within the comment section, wherein the user interface is configured to maintain the position of the user interface to locate the comment section within a viewing area of a display device while displaying the second rendering of the content within the viewing area of a display device.

Clause 2. The method of clause 1, wherein the method further comprises controlling the position of the user interface to display the comment concurrently with the second rendering of the content.

Clause 3. The method of clauses 1-2, wherein the method further comprises controlling the position of the user interface to display a related comment concurrently with the comment and the second rendering of the content.

Clause 4. The method of clauses 1-3, wherein the method further comprises determining that a media type associated with the comment includes a still image of the content, and wherein the second rendering comprises the still image of the content displayed within the viewing area of the display device in response to the user input.

Clause 5. The method of clauses 1-4, wherein the method further comprises: determining that a media type associated with the comment includes audio data of the content, and wherein the second rendering comprises a graphical user interface indicating a playback of the audio data; and causing an audio device to generate an audio output of the audio data.

Clause 6. The method of clauses 1-5, wherein metadata associated with the comment defines a time interval of video data defining the content, wherein the second rendering comprises displaying the time interval of the content within the viewing area of the display device in response to the user input.

Clause 7. The method of clauses 1-6, wherein the method further comprises: analyzing a user input to determine an input type based on data received from an input device; displaying the second rendering of the content within the comment section while maintaining a position of the user interface, in response to determining that the input type is a first input type; and displaying a customized user interface concurrently displaying the selected comment with at least one of the rendering of the content or the second rendering of the content, in response to determining that the input type is a second type.

Clause 8. The method of clauses 1-7, wherein the first input type includes a hover of a cursor over at least a portion of the comment.

Clause 9. The method of clauses 1-8, wherein the second input type includes a hover of a cursor over at least a portion of the comment and a user actuation of an input device that indicates a selection of the comment.

Clause 10. A method for execution to be performed by a data processing system, the method comprising: causing a display of a user interface comprising a video display area and a comment section, wherein a position of the user interface displays the comment section within a viewing area of a display device, the position of the user interface locates the video display area displaying a rendering of content outside of the viewing area; receiving a user input indicating a selection of a comment displayed within the comment section; and in response to receiving the user input, generating a custom user interface for rendering video content concurrently with a display of the comment, wherein the custom user interface is configured to have a threshold level of overlap between the rendering of the video content and the comment.

Clause 11. The method of clause 10, wherein the method further comprises controlling the position of the user interface to display the comment concurrently with the second rendering of the content.

Clause 12. The method of clauses 10-11, wherein the method further comprises controlling the position of the user interface to display a related comment concurrently with the comment and the second rendering of the content.

Clause 13. The method of clauses 10-12, wherein the method further comprises determining that a media type associated with the comment includes a still image of the content, and wherein the second rendering comprises the still image of the content displayed within the viewing area of the display device in response to the user input.

Clause 14. The method of clauses 10-13, wherein the method further comprises: determining that a media type associated with the comment includes audio data of the content, and wherein the second rendering comprises a graphical user interface indicating a playback of the audio data; and causing an audio device to generate an audio output of the audio data.

Clause 15. The method of clauses 10-14, wherein metadata associated with the comment defines a time interval of video data defining the content, wherein the second rendering comprises displaying the time interval of the content within the viewing area of the display device in response to the user input.

Clause 16. A system, comprising: means for causing a display of a user interface comprising a video display area and a text section, wherein a navigational position of the user interface displays the text section within a viewing area of a display device, the navigational position of the user interface locates the video display area displaying a rendering of content outside of the viewing area; means for receiving a user input indicating a selection of selected text displayed within the text section; and means for generating a second rendering of the content for display within the text section, in response to receiving the user input, wherein the user interface is configured to maintain the navigational position of the user interface to locate the text section within a viewing area of a display device while rendering audio or displaying a still image or a video of the second rendering of the content within the viewing area of a display device.

Clause 17. The system of clause 16, wherein the method further comprises controlling the navigational position of the user interface to display the comment concurrently while rendering the audio or displaying the still image or the video of with the second rendering of the content within the viewing area of the display device.

Clause 18. The system of clauses 16-17, wherein the method further comprises controlling the navigational position of the user interface to display a related comment concurrently with the comment and the second rendering of the content.

Clause 19. The system of clauses 16-18, further comprising means for determining that a media type associated with the comment includes a still image of the content, and wherein the second rendering comprises the still image of the content displayed within the viewing area of the display device in response to the user input.

Clause 20. The system of clauses 16-19, further comprising: means for analyzing a user input to determine an input type based on data received from an input device; means for displaying the second rendering of the content within the text section while maintaining the navigational position of the user interface, in response to determining that the input type is a first input type; and means for displaying a customized user interface concurrently displaying the selected text with at least one of the rendering of the content 116 or the second rendering of the content 117, in response to determining that the input type is a second type.

The invention claimed is:

1. A method for execution to be performed by a data processing system, the method comprising:
    causing a display of a user interface comprising a video display area and a comment section, wherein a position of the user interface displays the comment section within a viewing area of a display device and a first rendering of content is outside of the viewing area, wherein outside of the viewing area is off-screen and not displayed by the display device;
    receiving a user input indicating a selection of at least a portion of a comment displayed within the comment section; and
    in response to receiving the user input indicating the selection of the comment, generating a second rendering of the content for display within the comment section, wherein the user interface is configured to maintain the position of the user interface to locate the comment within the viewing area of the display device while concurrently displaying the second rendering of the content within the viewing area of the display device, wherein the second rendering, that is displayed in response to the user input indicating the selection of the comment, is positioned within the viewing area while the first rendering is positioned outside of the viewing area, wherein outside of the viewing area is where the first rendering of the content is not displayed by the display device.

2. The method of claim 1, wherein the method further comprises determining that a media type associated with the comment includes a still image of the content, and wherein the second rendering comprises the still image of the content displayed within the viewing area of the display device in response to the user input.

3. The method of claim 1, wherein the method further comprises:
    determining that a media type associated with the comment includes audio data of the content, and wherein the second rendering comprises a graphical user interface indicating a playback of the audio data; and
    causing an audio device to generate an audio output of the audio data.

4. The method of claim 1, wherein the comment is associated with a time interval of video data defining the content used to generate the first rendering, wherein the second rendering comprises displaying a portion of the content of the video data based on the time interval within the viewing area of the display device in response to the user input indicating the selection of the comment.

5. The method of claim 1, wherein the method further comprises:
    analyzing a user input to determine an input type based on data received from an input device;
    displaying the second rendering of the content within the comment section while maintaining a position of the user interface, in response to determining that the input type is a first input type; and
    displaying a customized user interface concurrently displaying the selected comment with at least one of the first rendering of the content or the second rendering of the content, in response to determining that the input type is a second type.

6. The method of claim 5, wherein the first input type includes a hover of a cursor over at least a portion of the comment.

7. The method of claim 5, wherein the second input type includes a hover of a cursor over at least a portion of the comment and a user actuation of an input device that indicates a selection of the comment.

8. The method of claim 1, wherein the position of the user interface is maintained to display the second rendering while concurrently displaying the comment.

9. The method of claim 1 wherein another input causes the first rendering to be positioned outside of a viewing area, wherein the display of the second rendering is within the viewing area that covers at least a portion of the comment.

10. The method of claim 1 wherein another input causes the first rendering to be positioned outside of the viewing area, wherein the display of the second rendering within the viewing area concurrently with the comment mitigates a need for a subsequent input to position the first rendering within the viewing area.

11. The method of claim 1 wherein another input causes the first rendering to be positioned outside of the viewing area, wherein the display of the second rendering within the viewing area concurrently with the comment mitigates a need for a subsequent input to return to the comment section after a position of the first rendering has moved within the viewing area.

12. The method of claim 1, wherein the comment is associated with a media type, wherein the second rendering includes a video playback or an audio playback based on the media type that is associated with the comment.

13. A method for execution to be performed by a data processing system, the method comprising:

causing a display of a user interface comprising a video display area and a comment section, wherein a position of the user interface displays the comment section within a viewing area of a display device and a first rendering of content is outside of the viewing area, wherein outside of the viewing area is off-screen and not displayed by the display device;

receiving a user input indicating a selection of a comment displayed within the comment section; and in response to receiving the user input indicating the selection of the comment, generating a custom user interface displaying a second rendering of the content concurrently with a display of the comment, wherein the custom user interface is configured to have a threshold level of overlap between the second rendering of the content and the comment, wherein the second rendering, that is displayed in response to the user input indicating the selection of the comment, is positioned within the viewing area while the first rendering is positioned outside of the viewing area.

14. The method of claim 13, wherein the method further comprises controlling the position of the user interface to display a related comment concurrently with the comment and the second rendering of the content.

15. The method of claim 13, wherein the method further comprises determining that a media type associated with the comment includes a still image of the content, and wherein the second rendering comprises the still image of the content displayed within the viewing area of the display device in response to the user input.

16. The method of claim 13, wherein the method further comprises:

determining that a media type associated with the comment includes audio data of the content, and wherein the second rendering comprises a graphical user interface indicating a playback of the audio data; and causing an audio device to generate an audio output of the audio data.

* * * * *